United States Patent [19]
Wilt

[11] Patent Number: 6,041,148
[45] Date of Patent: Mar. 21, 2000

[54] SYSTEM AND METHOD FOR EXTRACTING IMAGE DATA

[75] Inventor: Michael J. Wilt, Windham, N.H.

[73] Assignee: Acuity Imaging, LLC, Nashua, N.H.

[21] Appl. No.: 09/025,937

[22] Filed: Feb. 19, 1998

Related U.S. Application Data

[63] Continuation-in-part of application No. 08/953,772, Oct. 17, 1997.

[51] Int. Cl.[7] .................................................. G06K 9/56
[52] U.S. Cl. ...................... 382/308; 382/303; 382/304; 382/305
[58] Field of Search ................................ 382/171, 173, 382/180, 205, 206, 303, 307, 308, 284, 304

[56] References Cited

U.S. PATENT DOCUMENTS

| | | | |
|---|---|---|---|
| 4,554,593 | 11/1985 | Fox et al. ................................. | 358/455 |
| 4,665,556 | 5/1987 | Katoh et al. ............................. | 382/304 |
| 4,790,026 | 12/1988 | Gennery et al. ......................... | 382/303 |
| 4,972,359 | 11/1990 | Silver et al. ............................. | 382/168 |
| 4,972,495 | 11/1990 | Blike et al. .............................. | 382/304 |
| 4,974,261 | 11/1990 | Nakahara et al. ....................... | 382/141 |
| 5,146,592 | 9/1992 | Pfeiffer et al. .......................... | 345/344 |
| 5,793,899 | 8/1998 | Wolff et al. .............................. | 382/307 |

*Primary Examiner*—Amelia Au
*Assistant Examiner*—Jingge Wu
*Attorney, Agent, or Firm*—Bourque & Associates, P.A.

[57] ABSTRACT

A data extraction processor receives data, such as image data, at a high rate of speed and generates processed results, generally at a much lower overall data rate. This sort of processing is particularly useful for machine vision image data, because it can reduce a large image data set to a much smaller data set that is more immediately useful for the currently running application. The data extraction processor may include a segmentation processor, a gradient processor, or other similar types of data extraction processors. The disclosed data extraction processor includes a data flow controller which provides image data to the processors and receives the results from the processors. The data flow controller includes at least one FIFO (first-in, first-out) memory, which allows for the provision of data to the data extraction processor and the receipt of result data therefrom to occur at different rates. Since data extraction algorithms usually generate much less data that they receive, the data flow controller stalls the flow of output data while the analysis proceeds through the data. In some image-dependent situations, however, the analysis may generate more data than it receives. In these situations, the data flow controller stalls the incoming data while the additional results are generated.

13 Claims, 7 Drawing Sheets

# SYSTEM AND METHOD FOR EXTRACTING IMAGE DATA

RELATED APPLICATION

This application is continuation-in-part of U.S. patent application Ser. No. 08/953,772, filed Oct. 17, 1997, which is commonly-owned and fully incorporated herein by reference.

FIELD OF THE INVENTION

This invention relates generally to data extraction and more particularly, to data extraction systems and methods for use with various systems such as image processing and machine vision systems for example.

BACKGROUND OF THE INVENTION

Machine vision systems extract large amounts of quantitative information from digitized images for use in process control, quality assurance, and other applications. The minimal apparatus required for a machine vision system is a computer and means to capture digitized images. More advanced machine vision systems incorporate special hardware to assist with the image processing because the images contain large amounts of data to be processed.

Most of the special processing hardware currently used for machine vision falls into two general categories: image-in/image-out processors and statistical processors.

The image-in/image-out types of processors typically receive a serial stream of pixel data and generate a serial stream of processed pixel data at the same rate. For example, the Sumitomo Metals model IP90MD25 spatial & logical filter module can perform 3×3 linear convolutions or binary logical filters receiving and generating serial pixel data at up to 25 mhz.

The statistical type processors typically receive a serial stream of pixel data and accumulate statistics internally which provide quantitative information about the image. For example, the Sumitomo Metals model IP90C01 histogram processor receives a serial stream of pixel data at up to 50 mhz and accumulates a 256-bucket histogram internally. Another example of a statistical type processor is the Sumitomo Metals model IP90C18 feature extraction processor, which may be used in conjunction with labeling processors and memories to accumulate statistics in an attached memory.

SUMMARY OF THE INVENTION

The data extraction processor, which is the subject of this invention, receives data such as image data at a high rate and generates processed results, generally at a much lower overall data rate. This sort of processing is particularly useful for machine vision, because it can reduce an image to a much smaller data set that is more immediately useful for a currently running application. For example, the data extraction processor of the present invention can include a segmentation data feature, a gradient data feature, or other similar types of data extraction processors.

A necessary element of the various disclosed data extraction processors is a data flow controller which provides image data to the processor and receives the results from the processor. The data extraction algorithms usually generate much less data than they receive, although under some image-dependent situations, they may generate much more data than they receive. Thus, the data flow controller must be flexible enough to stall the incoming data stream while extra results are being generated, and stall the outgoing data stream while the data extraction processor is not producing results.

The data extraction processor of the present invention is capable of performing several different types of data extraction including segmentation and gradient data extraction. An exemplary segment record format is shown herein.

For segmentation processing, according to one feature of the present invention (segmentation processor), the image data is separated into horizontal segments of contiguous foreground and background pixels, and a segment record result is generated for each segment which is extracted from the image.

For gradient data extraction according to another feature of the data extraction processor of the present invention, the image data is analyzed for the presence of intensity gradients, and gradient data point records are generated for each qualifying gradient data point.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
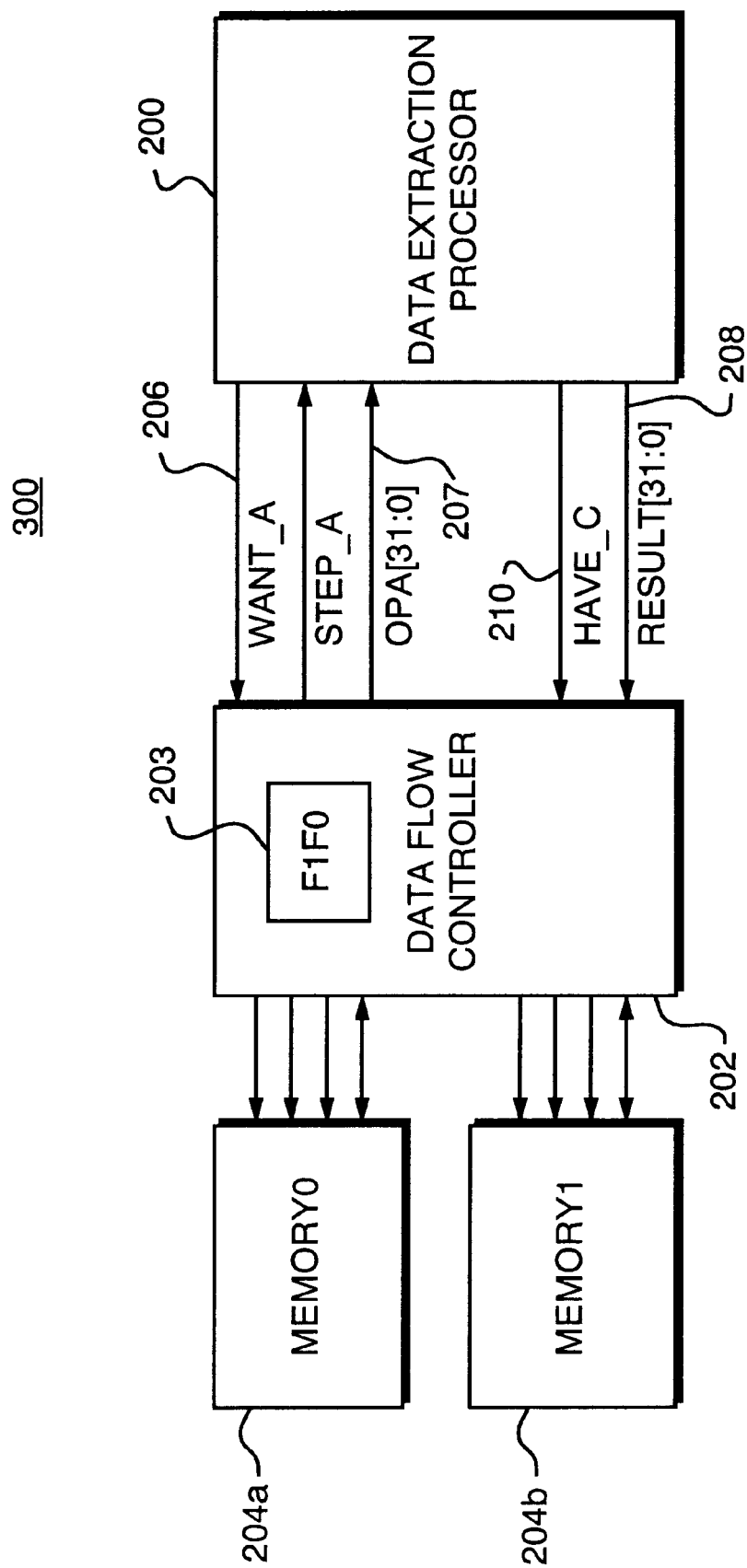
FIG. 1 is a block schematic diagram which shows the relationship between a data extraction processor and the data flow controller.

This invention features a system 300, FIG. 1, including a data extraction processor 200 which generates records reporting specific information extracted from data such as image data stored in memory. The image data is preferably formatted into a plurality of data samples. Each of the data samples corresponds to an image pixel and has multiple bits representing the image pixel. A processor word or memory word can include multiple data samples. It operates at very high speed by processing all of the pixel data (multiple pixels) in each processor word simultaneously. In general, this processor is designed to /generate much less data than it consumes, effectively summarizing the image data into a more concise and useful format.

The data extraction processor 200 according to the present invention receives pixel data one processor word at a time from image memory, in the present invention memory0 204a or memory1 204b, under control of data flow controller 202. The data flow controller 202 manages the flow of data through the system and allows image data flow into the data extraction processor and result data flow out of the data extraction processor to occur at different rates. Data flow rate independence is accomplished by including at least one internal FIFO (first-in, first-out) memory 203 and associated control logic in data flow controller 202.

The data flow controller 202 provides data as long as the data extraction processor asserts a "want a" signal 206, which indicates that data is desired. The data extraction processor 200 can inhibit the flow of data by negating this signal. The data flow controller 202 may also inhibit the flow of data for other reasons such as page crossings in the memory banks or a surplus of outgoing data. As long as there is valid data in the data extraction processor 200, it may generate outgoing data by putting it on the "result" bus 208 and asserting the "have c" signal 210.

SEGMENTATION PROCESSING

Figure 2:
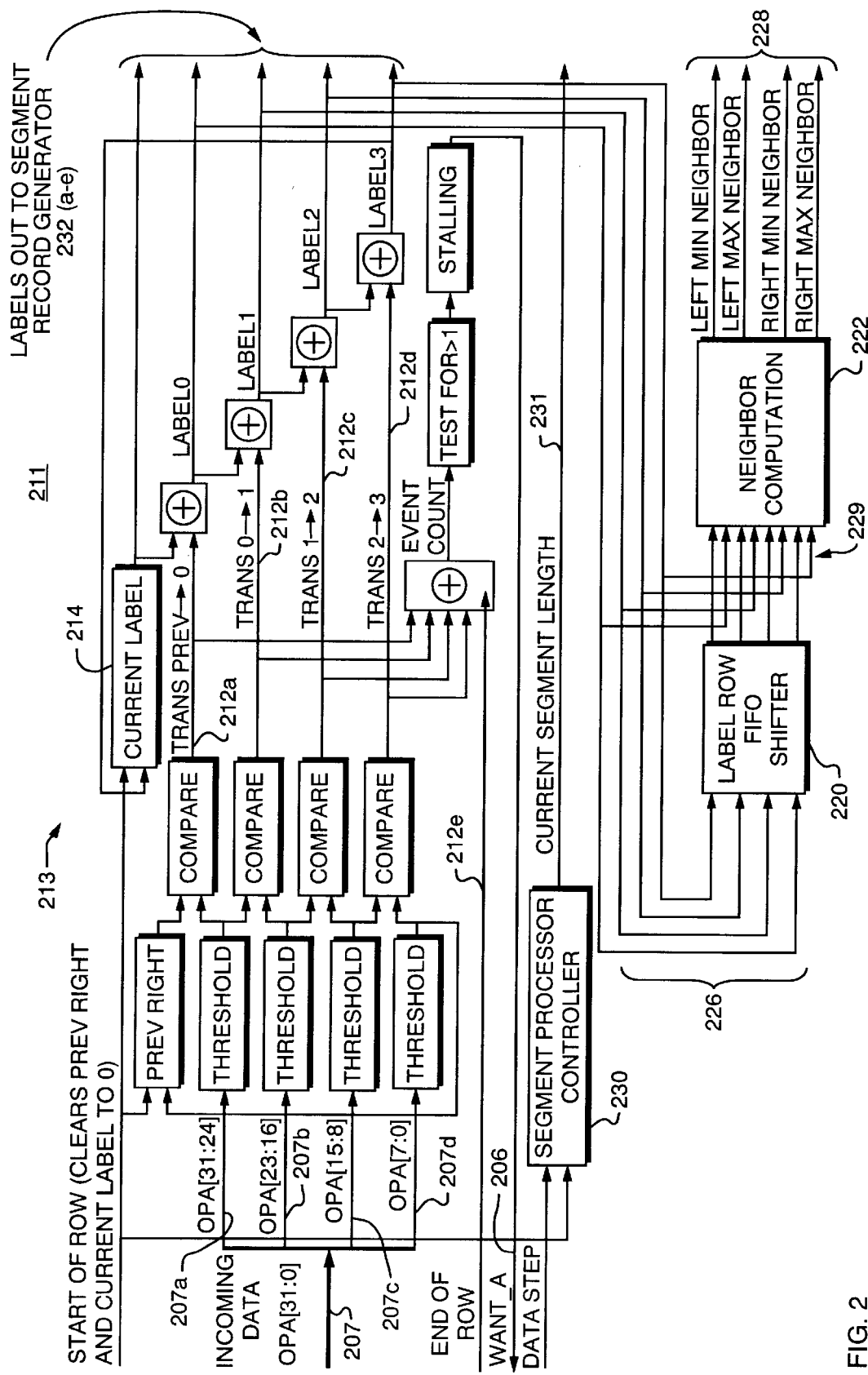
FIG. 2 is a schematic diagram which shows the label computation portion of a segmentation processor which is one feature or type of the data extraction processor of the present invention.
Figure 4:
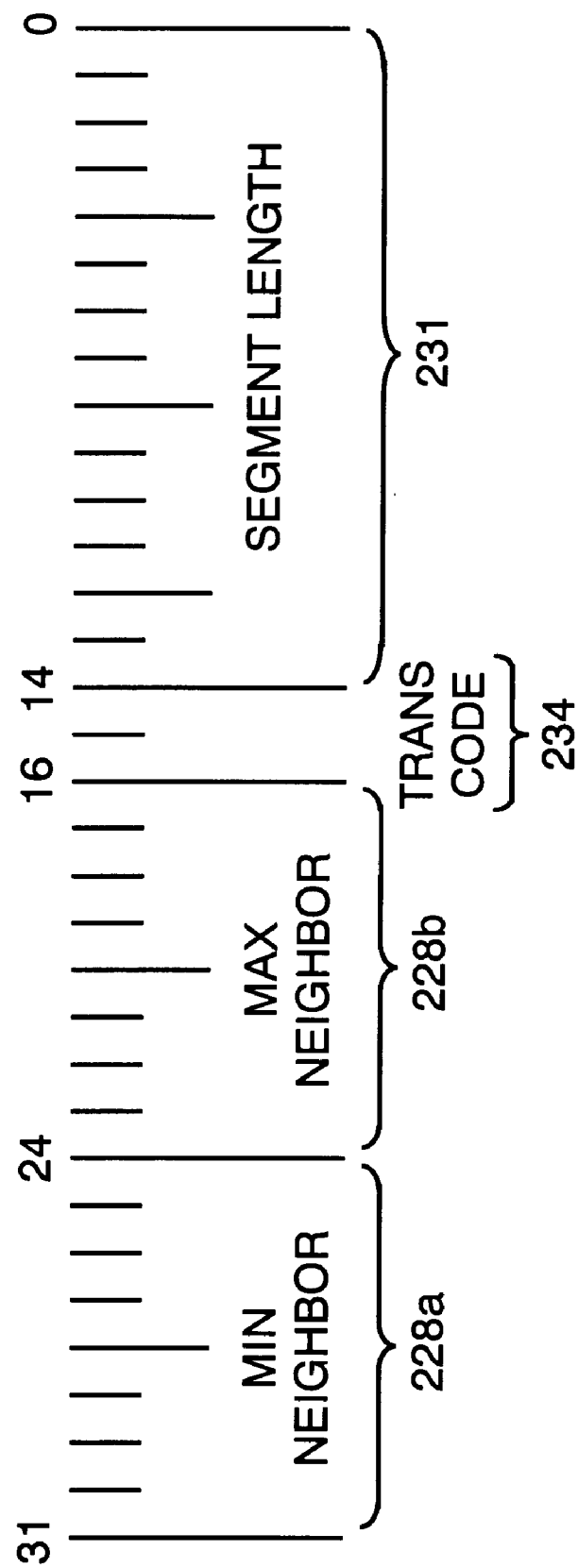
FIG. 4 is a schematic diagram showing the format of the segment record.

A segmentation processor 211, as shown schematically in FIG. 2, is one type of data extraction processor. This type of processing utilizes a data extraction processor especially configured as a segmentation processor, which reports contiguous groups of similar pixels. The segmentation processor 211 only generates segment records when the image data changes from the foreground to the background or vice versa. A segment record is a block of data containing information about the segment, including horizontal position, length, and connections to segments in the previous row. The segment record is packed into a processor word of data in the preferred embodiment of this invention, and the information is packed as shown in FIG. 4. The implementation described herein determines whether a pixel is in the foreground or background by applying a threshold range computation, but this is not a limitation of the current invention. Many other algorithms for separating foreground pixels from background pixels are well known in the art.

Figure 3:
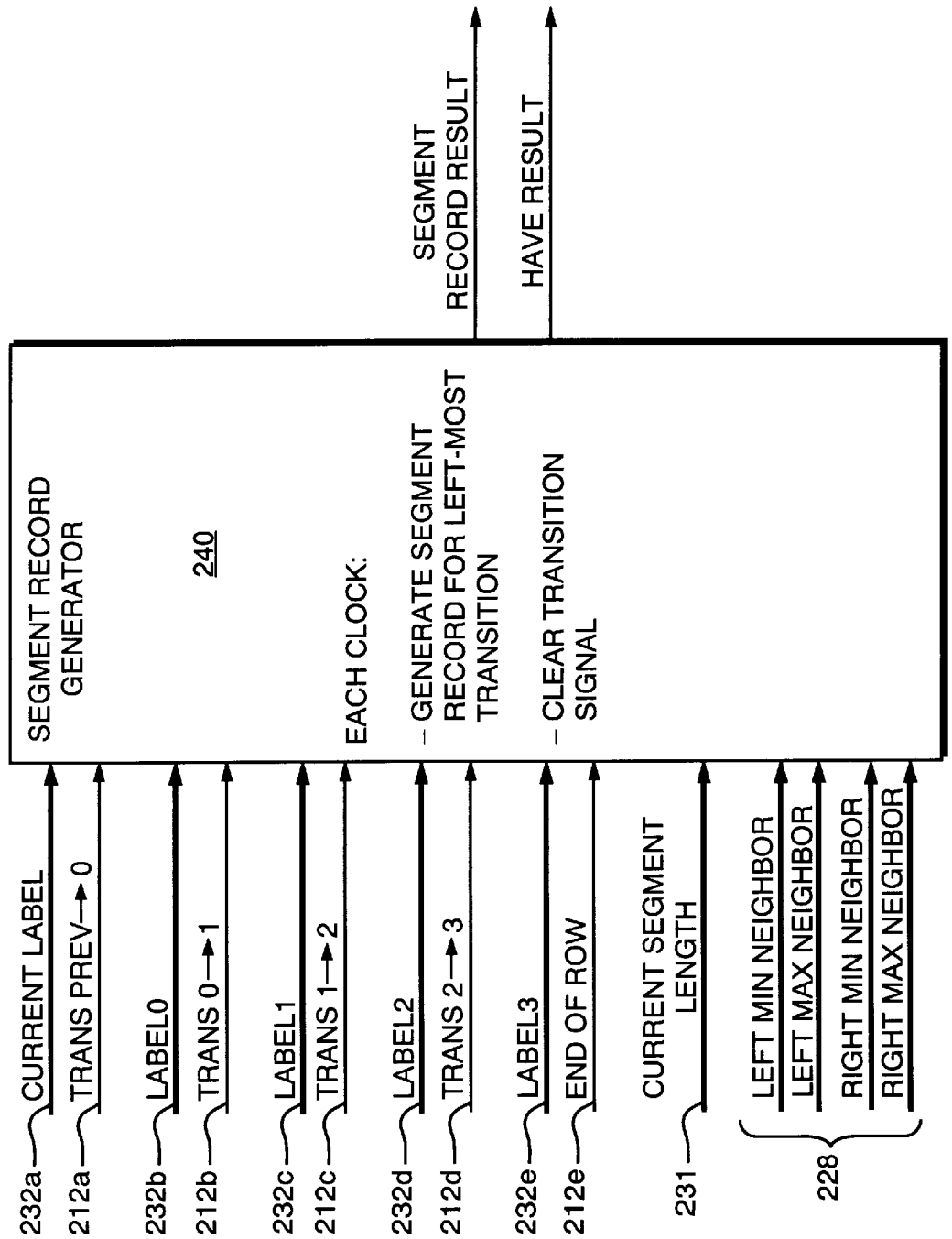
FIG. 3 is a schematic diagram, which shows the segment record generation portion of the segmentation processor.

The segmentation processor 211 includes a label computation engine 213 and a segment record generator 240 (FIG. 3). The label computation engine 213 simultaneously receives multiple pixels (in the present example, four pixels 207a–207d) packed into a single processor word of data 207 (labeled in FIGS. 1 and 2 as opa[31:0]). Each pixel is simultaneously subject to the threshold computation and determined to be either in the foreground or the background. The pixels being analyzed are all compared against their neighbors to determine what transitions must be processed. Up to five transition events 212a–212e (labeled in FIG. 2 as trans prev->0, trans 0->1, trans 1->2, trans 2->3, and end of row) may occur on a single processor word of data. There are three transition opportunities or transition event signals 212b–212d within the data word itself, as well as one transition opportunity or transition event signal 212a between the present data word and the previous data word, and one transition event signal 212e at the end of row, which is also treated as a transition event.

At the beginning of each row of data, which is considered to be a "current row" of data, current label 214 is cleared to zero (background). The transition bits 212a–212d (i.e., trans prev->0, trans 0->1, trans 1->2, trans 2->3) are treated as single-bit numbers and added to the current label to compute the correct label code for each of the potential transitions. These computations are all done simultaneously, and the label codes 232a–232e (labeled in FIG. 2 as label0–label3) are fed both to the label row FIFO shifter 220 and the neighbor computation unit 222. The neighbor computation unit 222 receives the current row labels 224 and the previous row labels 226 from the row shifter 220 simultaneously, and computes the connection relationships 228 which are reported with each segment record.

When the event count 216 exceeds one, which indicates that a transition event signal has been detected, the segmentation processor 211 stalls the incoming data by negating the "want a" signal 206. The data flow is resumed when all of the segment records associated with the pending transition events have been processed and generated.

The segment record generator 240, FIG. 3, is responsible for creating segment records for each transition event. It receives the transition event signals 212a–212e (FIG. 2) and the associated label values 232, the current segment length 231, and the connection information 228 from the label computation engine.

The format of an exemplary segment record is shown in FIG. 4. The minimum neighbor 228a and maximum neighbor 228b are segment codes from the previous row which are connected to this segment. The two (2) bit transition code 234 indicates whether this segment record is the first in a row, and the segment length 231 is the number of pixels contained in the segment. The set of segment records thus generated contains all of the information necessary to perform a complete connectivity analysis of the image.

Gradient data processing is a second type of data extraction processing which is accomplished according to the teachings of the present invention. Gradient data processing reports gradient events in one-dimensional image data. It only generates data when a qualifying gradient event is detected in the image.

Figure 5:
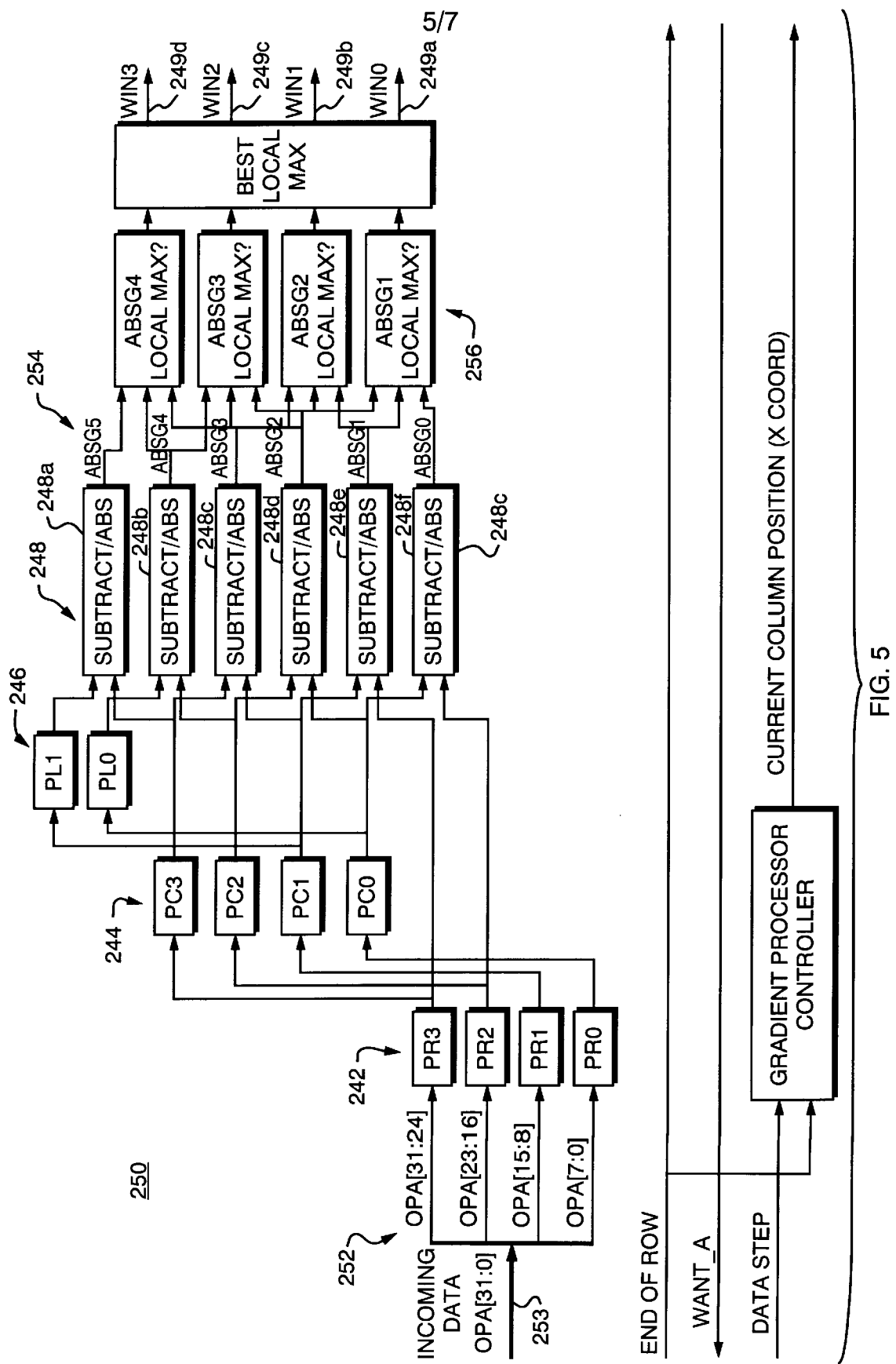
FIG. 5 is another schematic diagram which shows the quad gradient detection portion of the gradient data extraction processor.

The gradient data extraction processor 250, FIG. 5, receives more than one and preferably four pixels 252 packed into a single processor word 253 of data simultaneously. The data first enters a first set of registers 242 "pR0"–"pR3", and is then passed to a second set of registers 244 "pC0"–"pC3", and finally to a third set of registers 246 "pL0"–"pL1". This series of registers forms an 8-element array to provide the necessary amount of data to perform the gradient computations.

Six gradient values 254 are computed by gradient calculators 248a–248f using the convolution weights [−1, 0, 1]. These gradient values correspond to the four central pixels and one additional gradient value on either side. These gradient values 254 are labeled "absg0"–"absg5". These gradient values are compared with their neighbor values in neighbor comparator unit(s) 256, looking for and identifying a local maximum which is greater than both of its neighbors. This computation results in one of the signals "win0"–"win3", 249a–249d, being set when one of the gradient values is greater than both of its neighbors, greater than the minimum acceptable gradient, and greater than all of the other candidate values. If the gradient values are equal, an arbitrary choice is made resulting in a single "win" signal being set.

Figure 6:
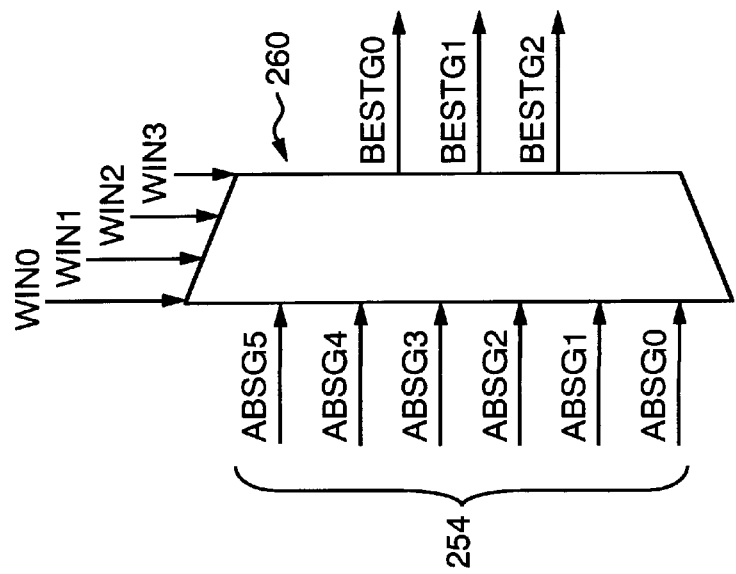
FIG. 6 is a schematic diagram which shows the gradient sub-pixel information selection portion of the gradient data extraction processor.

The gradient sub-pixel information selection multiplexer (MUX) 260, FIG. 6, selects the absolute gradient values for the "winning" gradient data point, that is, the gradient value to be reported. For example, if "win3" is set, then "bestg0" would be set to the value of "absg3", "bestg1" would be set to the value of "absg4" and "bestg2" would be set to the value of "absg5".

Figure 7:
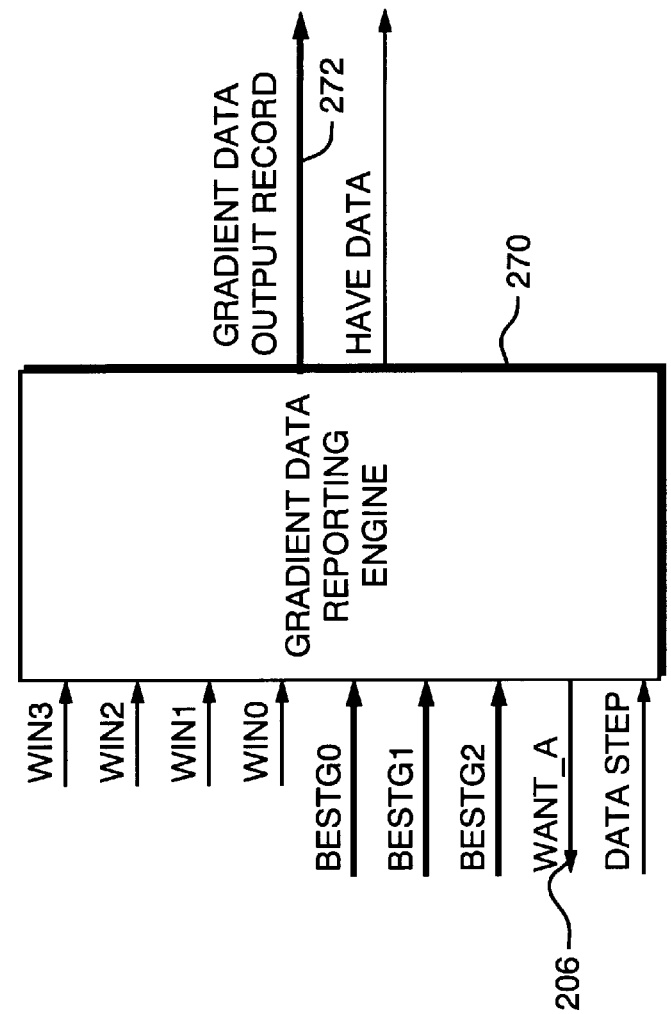
FIG. 7 is a schematic diagram which shows the gradient reporting circuit portion of the gradient data extraction processor.
Figure 8:
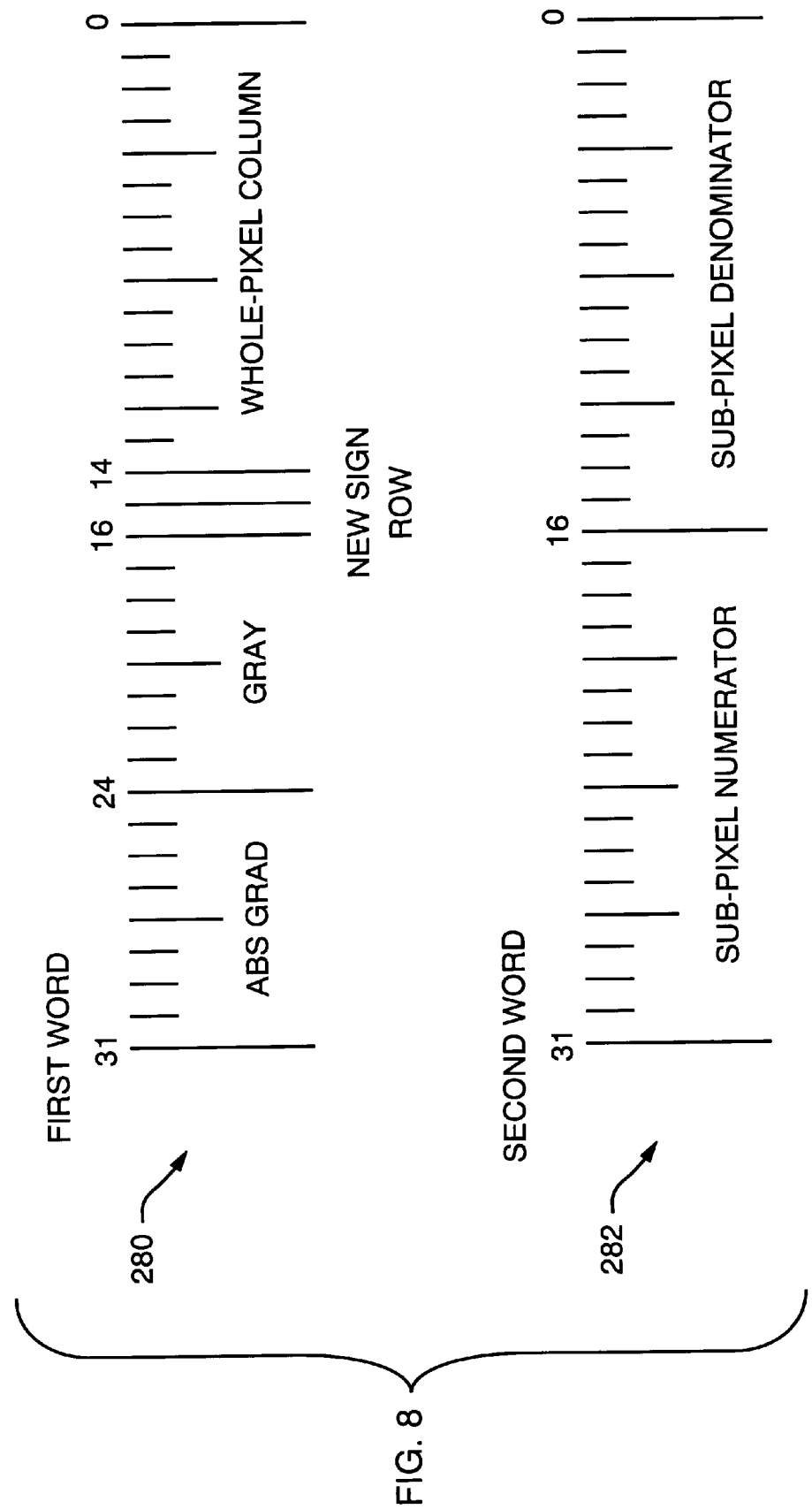
FIG. 8 illustrates the format of the gradient data point record.

The gradient data reporting engine 270, FIG. 7, is responsible for generating the correct gradient data output record 272 when one of the binary signals "win0"–"win3" is set. The gradient data reporting engine 270 generates a data record 272 including a first word 280, FIG. 8, containing: (a) the maximum gradient value (labeled as "abs grad" in FIG. 8); (b) the gray value of the central pixel (labeled as "gray" in FIG. 8); (c) bits indicating whether this is the first point of a row and whether the gradient is positive or negative (labeled as "sign" in FIG. 8); (d) and the column coordinate (labeled as "whole-pixel column in FIG. 8) of the data point.

The gradient data reporting engine 270 then generates a second word 282 (FIG. 8) containing the numerator and denominator which may be used to compute the fractional position of the gradient data point. Because the gradient data output record 272 is two words 280, 282, requiring two clocks to report, the flow of incoming data is stalled by negating "want a" 206 for one cycle whenever a gradient data point is detected.

Accordingly, the present invention provides a novel system and method to process and extract data, such as image data, from a large amount of data, in order to be more easily and readily useable by a currently running application requiring such data.

Modifications and substitutions by one of ordinary skill in the art are considered to be within the scope of the present invention which is not to be limited except by the claims which follow.

What is claimed is:

1. A data extraction system comprising:

at least one data storage memory for storing data formatted into a plurality of data samples, each of said plurality of data samples having multiple bits;

a data extraction processor, for receiving said data from said data storage memory one processor word at a time, wherein a processor word includes at least two of said data samples, for simultaneously processing said at least two of said data samples in each said processor word, and for generating at least one result record containing information extracted from said data samples in at least one said processor word, said data extraction processor comprising a segmentation processor including:

a label computation engine, coupled to said data flow controller, for simultaneously receiving said data samples in each said processor word, for identifying transitions between said data samples and generating transition bit signals for each potential transition, and for computing a label code for each said potential transition using said transition bit signals;

a label row FIFO shifter, coupled to said label computation engine, for receiving and storing said label code for each said potential transition;

a neighborhood computation unit, coupled to said label computation engine and to said label row FIFO shifter, for receiving current row labels from said label computation engine and previous row labels from said label row FIFO shifter, and for computing connecting relationships to segments in a previous row;

a segment processor controller, coupled to said data flow controller, for providing a current segment length; and a segment record generator, coupled to said label computation engine, said segment processor controller and said neighborhood computation unit, for receiving said current row labels, said current segment length, and information about said connecting relationships, and for generating at least one segment record for each transition event; and a data flow controller, coupled between said at least one data storage memory and said data extraction processor, for controlling the flow of processor words into said data extraction processor and the flow of said result records out of said data extraction processor.

2. The data extraction system as claimed in claim 1, wherein said data includes image data, and wherein each said data sample corresponds to an image pixel represented with said multiple bits in said data sample.

3. The data extraction system as claimed in claim 1, wherein said data flow controller comprises at least one internal first-in, first-out (FIFO) memory; and control logic to manage the flow of data through said system.

4. The image data extraction system as claimed in claim 2, wherein said data extraction processor is a gradient data extraction processor including:

a plurality of registers, said plurality of registers arranged in series and including a first set of registers, a second set of registers and a third set of registers, wherein each of said registers receives one of said data samples corresponding to an image pixel;

a plurality of gradient calculators, coupled to said plurality of registers, for computing gradient values corresponding to at least some of said data samples;

at least one neighborhood comparator unit, coupled to said plurality of gradient calculators, for identifying a local maximum gradient value which is greater than neighboring gradient values and for indicating a winning gradient point;

a gradient sub-pixel information selection multiplexer, coupled to said at least one neighborhood comparator unit, for selecting absolute gradient values for said winning gradient point; and a gradient data reporting engine, coupled to said gradient sub-pixel information selection multiplexer, for generating a gradient data output record.

5. A method of extracting segment data from image data and generating records reporting said segment data, said method comprising the steps of:

zeroing a current label at the beginning of a current row of image data;

receiving image pixel data samples from image memory, one processor word at a time, said processor word including at least two said image pixel data samples; and processing each said processor word according to the following steps:

simultaneously determining if each said image pixel data sample in said processor word is in the foreground or background;

simultaneously identifying any foreground/background transitions between each of said image pixel data samples and neighboring image pixel data samples and generating a transition bit signal for each possible transition;

adding each said transition bit signal to said current label to compute a correct label code for each possible transition;

receiving label codes for a row previous to said current row;

computing connection relationships to segments in said row previous to said current row;

if a transition is identified, reporting at least one record containing information about said identified transition within said processor word; and updating said current label by adding the total number of identified transitions.

6. The method of claim 5, wherein the step of receiving image pixel data samples from image memory is stalled when said transition is identified.

7. The method of claim 5, wherein each said processor word includes four image pixel data samples.

8. A method of extracting gradient data from image data and generating records reporting said gradient data comprising the steps of:

receiving a plurality of pixel data samples packed into a single processor word of data simultaneously;

computing gradient values between each of said pixel data samples using convolution weights;

comparing said gradient values with neighbor gradient values to identify a local maximum gradient value greater than said neighbor gradient values;

reporting a winning gradient data point by generating a first gradient data word comprising at least one of the maximum gradient value, the gray value of the central pixel, bits to indicate first point in a row, positive, negative and column coordinate; and generating a second gradient data word comprising a numerator and a denominator which may be used to compute the fractional position of the gradient data point.

9. The method of claim 8, further including the steps of:

setting a winning gradient point signal for said winning gradient data point after identifying said local maximum gradient value; and selecting absolute gradient values for said winning gradient point.

10. The method of claim 8, wherein the step of receiving image pixel data samples from image memory is stalled when a gradient data point is detected.

11. The method of claim 10 wherein said first and second gradient data words require two clock cycles to report, and wherein the step of receiving image pixel data samples from image memory is stalled for one clock cycle.

12. The method of claim 8, wherein each said processor word includes four pixel data samples corresponding to four image pixels, wherein said computed gradient values include gradient values for each of said image pixels and gradient values on either side of said image pixels.

13. An image data extraction system comprising:

at least one data storage memory for storing image data formatted into a plurality of data samples, each of said plurality of image data samples corresponding to an image pixel having multiple bits;

a data flow controller, coupled between said at least one data storage memory and a data extraction processor, for controlling the flow of processor words into said data extraction processor and the flow of result records out of said data extraction processor; and a data extraction processor, for receiving said image data from said data storage memory one processor word at a time, wherein a processor word includes at least two of said image data samples, for simultaneously processing said at least two of said image data samples in each said processor word, and for generating at least one result record containing information extracted from said at least two image data samples in at least one said processor word, said data extraction processor comprising a segmentation processor including:

a label computation engine, coupled to a data flow controller, for simultaneously receiving said at least two image data samples in each said processor word, for identifying transitions between said at least two image data samples and generating transition bit signals for each potential transition, and for computing a label code for each said potential transition using said transition bit signals;

a label row FIFO shifter, coupled to said label computation engine, for receiving and storing said label code for each said potential transition;

a neighborhood computation unit, coupled to said label computation engine and to said label row FIFO shifter, for receiving current row labels from said label computation engine and previous row labels from said label row FIFO shifter, and for computing connecting relationships to segments in a previous row;

a segment processor controller, coupled to said data flow controller, for providing a current segment length; and a segment record generator, coupled to said label computation engine, said segment processor controller, and said neighborhood computation unit, for receiving said current row labels, said current segment length, and information about said connecting relationships, and for generating at least one segment record for each transition event.

* * * * *